United States Patent
Mateus et al.

(10) Patent No.: US 8,711,955 B2
(45) Date of Patent: Apr. 29, 2014

(54) SPREADING TECHNIQUE APPLIED TO BROADBAND MOBILE COMMUNICATIONS BY SATELITE RELYING ON DVB-RCS

(75) Inventors: Jean-Michel Mateus, Toulouse (FR); Pascal Aubert, Teyssode (FR); Erwan Corbel, Villeneuve-Tolosane (FR); Stéphane Furlan, Frouzins (FR)

(73) Assignee: Alcatel Lucent, Paris (FR)

( * ) Notice: Subject to any disclaimer, the term of this patent is extended or adjusted under 35 U.S.C. 154(b) by 1027 days.

(21) Appl. No.: 11/993,450

(22) PCT Filed: Nov. 6, 2006

(86) PCT No.: PCT/FR2006/051137
§ 371 (c)(1),
(2), (4) Date: Nov. 22, 2010

(87) PCT Pub. No.: WO2007/054652
PCT Pub. Date: May 18, 2007

(65) Prior Publication Data
US 2011/0064116 A1    Mar. 17, 2011

(30) Foreign Application Priority Data
Nov. 7, 2005 (EP) .................................. 05300895

(51) Int. Cl.
*H04L 27/00*  (2006.01)
*H04L 27/36*  (2006.01)
*H04L 27/38*  (2006.01)

(52) U.S. Cl.
USPC ............................. 375/259; 375/295; 375/316

(58) Field of Classification Search
USPC ......... 375/259, 260, 295, 316, 354, 355, 377; 341/126, 144, 145, 155, 156; 708/290, 708/313
See application file for complete search history.

(56) References Cited

U.S. PATENT DOCUMENTS 3,206,676 A    9/1965  Sichak
3,918,054 A  * 11/1975  Collins ........................ 342/192

(Continued)

FOREIGN PATENT DOCUMENTS

WO    WO 2004/075430 A1    9/2004

OTHER PUBLICATIONS

M. Miller et al, "Two-way global broadcast system architecture", 2003 IEEE Military Communications Conference, Milcom 2003, Boston, MA, Oct. 13-16, 2003, New York, NY, IEEE, US, vol. 2 of 2, Oct. 13, 2003, XP010698250.

(Continued)

Primary Examiner — Tesfaldet Bocure
(74) Attorney, Agent, or Firm — Fay Sharpe LLP

(57) ABSTRACT

A device (D1) is dedicated to the processing of signals to be transmitted by waves, within a communication terminal (T). This device (D 1) includes i) memory (M1) for temporarily storing a sequence of digital samples of an analogue input signal according to a first sampling frequency and in a manner synchronized with respect to starts of periodic time slots, and ii) digital/analogue conversion (CV2) for generating, during each time slot and according to a second sampling frequency equal to N times the first sampling frequency, with N an integer strictly greater than 1, an analogue output signal, to be transmitted, representative of N repetitions of the sequence of digital samples that is stored in the memory (M1) during the time slot concerned, so as to output the analogue signal according to a symbol rate equal to N times a reference symbol rate.

20 Claims, 4 Drawing Sheets

LEGEND

| | |
|---|---|
| MR | modulator |
| T | communication terminal |
| CF1 | first frequency conversion module |
| CV1 | first conversion module |
| M1 | storage module |
| CV2 | second conversion module |
| CF2 | second frequency conversion module |
| D1 | first device |

(56) References Cited

U.S. PATENT DOCUMENTS

| | | | | |
|---|---|---|---|---|
| 4,181,822 | A | * | 1/1980 | Workman ................... 704/201 |
| 4,183,065 | A | * | 1/1980 | Rhody et al. ................. 386/328 |
| 4,868,774 | A | * | 9/1989 | Beukara ...................... 708/300 |
| 5,021,882 | A | * | 6/1991 | Schreiber ................. 375/240.01 |
| 5,287,539 | A | * | 2/1994 | West, Jr. ........................ 455/1 |
| 6,356,224 | B1 | * | 3/2002 | Wohlfarth ................... 341/147 |
| 6,510,182 | B1 | * | 1/2003 | Lee et al. ...................... 375/259 |
| 6,515,605 | B2 | * | 2/2003 | Panasik et al. ............... 341/143 |
| 2002/0158784 | A1 | * | 10/2002 | Panasik et al. ............... 341/144 |
| 2003/0054777 | A1 | * | 3/2003 | Hoctor .......................... 455/108 |
| 2003/0071606 | A1 | * | 4/2003 | Sunter ........................ 324/76.15 |
| 2005/0213599 | A1 | * | 9/2005 | Clawson ....................... 370/437 |
| 2006/0126576 | A1 | * | 6/2006 | Dale et al. .................... 370/336 |

OTHER PUBLICATIONS

Patent Abstracts of Japan, vol. 017, No. 337 (E-1388), Jun. 25, 1993 corresponding to JP 05 041685 A (Iwatsu Electric Co., Ltd.) Feb. 19, 1993.

* cited by examiner

| LEGEND | |
|---|---|
| MR | modulator |
| T | communication terminal |
| CF1 | first frequency conversion module |
| CV1 | first conversion module |
| M1 | storage module |
| CV2 | second conversion module |
| CF2 | second frequency conversion module |
| D1 | first device |

| LEGEND | |
|---|---|
| MCH | clock control module |
| Fe1 | first frequency |
| M1 | storage module |
| CV2 | second conversion module |
| CF2 | second frequency conversion module |
| D1 | first device |

FIG.3

| | WO 2007/054652 |
|---|---|
| MR | modulator |
| T | communication terminal |
| CF1 | first frequency conversion module |
| CV1 | first analog to digital conversion module |
| M1 | storage module |
| CV2 | second analog to digital conversion module |
| CF2 | second frequency conversion module |
| D1 | first device |
| MD | demodulation module |
| CF4 | fourth frequency conversion module |
| CV4 | fourth analog to digital conversion module |
| CB | combination means |
| M2 | second storage means |
| CV3 | third analog to digital conversion module |
| CF3 | third frequency conversion module |
| R | receiver |
| DR | carrier demodulator |
| MS | summation module |
| MCD | compensation module |
| MED | estimation module |
| D2 | second device |

⇐ LEGEND

LEGEND

| | |
|---|---|
| CB | combination means |
| M2 | second storage module |
| CV3 | third analog to digital conversion module |
| CF3 | third frequency conversion module |
| MS | summation module |
| MCD | compensation module |
| MED | estimation module |
| FE4 | fourth sampling frequency |
| MCH | clock control module |
| D2 | second device |

FIG. 8

| | |
|---|---|
| MD | demodulation module |
| CF4 | fourth frequency conversion module |
| CV4 | fourth analog to digital conversion module |
| CB | combination means |
| M2 | second storage module |
| CV3 | third analog to digital conversion module |
| CF3 | third frequency conversion module |
| R | receiver |
| DR | carrier demodulator |
| MS | summation module |
| MCD | compensation module |
| MED | estimation module |
| D2 | second device |

⇐ LEGEND

FIG. 10

| | |
|---|---|
| MD | demodulation module |
| CF4 | fourth frequency conversion module |
| CV4 | fourth analog to digital conversion module |
| CB | combination means |
| M2 | second storage module |
| CV3 | third analog to digital conversion module |
| CF3 | third frequency conversion module |
| R | receiver |
| DR | carrier demodulator |
| MS | summation module |
| MCD | compensation module |
| MED | estimation module |
| D2 | second device |

⇐ LEGEND

FIG.11

| | |
|---|---|
| DM | demodulator |
| CF4 | fourth frequency conversion module |
| CV4 | fourth analog to digital conversion module |
| MR | modulator |
| MCB2 | second combination module |
| MCB1 | first combination module |
| CB | combination means |
| M2 | second storage module |
| MM1 | first storage module |
| DM | demultiplexing module |
| CV3 | third analog to digital conversion module |
| CF3 | third frequency conversion module |
| DR | carrier demodulator |
| R | receiver |
| MCBK | last combination module |
| MMK | last storage module |
| MM2 | second storage module |
| D2 | second device |

FIG.12

⇐ LEGEND

SPREADING TECHNIQUE APPLIED TO BROADBAND MOBILE COMMUNICATIONS BY SATELITE RELYING ON DVB-RCS

TECHNICAL FIELD

The invention concerns communication networks, and more precisely radio communications between communication terminals.

Here "communication terminal" means any fixed or mobile (or portable) radio communication equipment capable of exchanging data in the form of signals by radio with another equipment, possibly via one or more communication satellites.

It can therefore be a question of, for example, a terrestrial communication station (possibly of the satellite type), a satellite gateway (or hub), an individual or collective send/receive terminal, or a fixed or portable computer, possibly of the satellite type.

BACKGROUND

Certain communication terminals (possibly of the satellite type), for example those, where applicable for collective use, that are installed in transportation means such as motor vehicles (buses, coaches, trucks, cars), trains, aircraft or boats, have send/receive antennas the dimensions whereof can cause problems in the presence of certain utilization constraints.

Thus to enable operation in the Ku band (12 to 18 GHz), it has been proposed that the send/receive antennas have a dimension along their greater axis between 60 and 70 cm. At the same time, international standardization organizations such as the ETSI (European Telecommunication Standards Institute) and the FCC (Federal Communication Commission) are imposing limitations on the off-axis power spectral density to adjacent satellites in order to limit the level of interference they receive. This limitation is defined by conditions involving the off-axis angle ($\theta$) of the main lobe of the antenna and the ratio (K) between the aggregate power density of all the terminals transmitting at the same time on the same frequency band (full load) and the power density of a single communication terminal. Remember that in the case of MF-TDMA type transmission, K is equal to 1, in contrast to the case of CDMA type transmission in which K is the number of simultaneous users.

It can be shown that under certain conditions, for example in the presence of DVB-RCS (Digital Video Broadcasting—Return Channel by Satellite) satellite communications, a communication terminal equipped with a 60 to 70 cm antenna has an off-axis power spectral density higher than that authorized by the conditions defining the limitation referred to above. It is then necessary to reduce the power spectral density used by a factor that can be equal to 10.

A standard solution for reducing the power spectral density is to use a direct spreading technique that multiplies the wanted signal by a sequence, for example of pseudo-random type, with a symbol timing rate (or chip timing rate) higher than the payload symbol timing rate. Unfortunately this solution has at least three drawbacks: it necessitates modification of the communication terminal so that it is able to effect the aforementioned multiplication, it necessitates a modification of the demodulator, which is installed in a communication gateway (possibly of the satellite type), for example, in order for it to be able to decode the new symbol timing, and it necessitates on reception synchronization of the codes with a view to despreading the signal, which requires a temporal accuracy of the order of a fraction of a symbol (or chip).

Another solution uses FEC type codes with a 1/N redundancy higher than that (equal to 1/2) of the lowest code of the DVB-RCS standard. This solution reduces the Es/NO ratio (energy of one symbol/noise power spectral density) and consequently the power spectral density. Unfortunately, this solution also has at least three drawbacks: it necessitates modification of the communication terminal so that it is able to use a symbol timing rate lower than that of the DVB-RCS standard, it necessitates modification of the demodulator, which is installed in a communication gateway (possibly of the satellite type), for example, for it to be able to decode the new coding timing rates, and it leads to a probable limitation of the Es/NO ratio because of the receive demodulation threshold, and consequently modification of the algorithms of the demodulator in order to improve that threshold.

BRIEF SUMMARY

No known solution proving entirely satisfactory, an object of the invention is therefore to improve on the situation.

To this end it proposes a first device (or spreading device) dedicated to the processing of signals to be transmitted by radio, and comprising:
  storage means responsible for storing temporarily a sequence of digital samples of an analog input signal at a first sampling frequency and synchronously with the beginnings of periodic time slots, and
  digital/analog conversion means responsible for generating, during each time slot and at a second sampling frequency equal to N times the first sampling frequency, where N is an integer strictly greater than 1, an analog output signal to be transmitted representing N repetitions of the sequence of digital samples stored in the storage means during the time slot concerned, so as to deliver the analog signal at an output at a symbol rate equal to N times a reference symbol rate.

The first device (or spreading device) according to the invention can have other features and in particular, separately or in combination:
  clock control means can be responsible for converting reference clock signals at the first frequency into working clock signals at the second frequency and for feeding the digital/analog conversion means with the working signals so that they can operate at the second frequency;
  in a first variant, and in the presence of a ratio between the first frequency and the reference symbol rate greater than N, the digital/analog conversion means can be responsible for reducing by a factor N the number of samples per symbol of the sequence of digital symbols repeated N times, whilst operating at the first frequency;
  in a second variant it can comprise clock control means responsible for converting reference clock signals at the first frequency into working clock signals at an intermediate frequency equal to J1 times the first frequency and less than the second frequency, and for feeding the digital/analog conversion means with the working signals so that they can operate at the intermediate frequency. In this case, the digital/analog conversion means are responsible for reducing by a factor K1 the number of symbols per symbol of the sequence of digital samples repeated N times, where J1*K1=N, whilst operating at the intermediate frequency;
  analog/digital conversion means can be responsible for sampling an analog input signal (to be transmitted) to produce a sequence of digital samples at the first sampling frequency and synchronously with the beginnings of periodic time slots;

it can also comprise, on the one hand, first frequency conversion means responsible for converting the "primary" frequency of the analog input signal into a "secondary" frequency before it feeds the analog/digital conversion means and, on the other hand, second frequency conversion means responsible for converting the secondary frequency of the analog output signal into the primary frequency.

The invention also proposes a radio communication terminal equipped with a first signal processing device (or spreading device) of the type described hereinabove.

The invention further proposes a device for processing analog signals coming from a signal processing device and comprising:

analog/digital conversion means responsible for sampling an analog input signal representing N repetitions of sequences of digital samples, where N is an integer strictly greater than 1, to produce N identical sequences of digital samples at a third sampling frequency equal to N times a fourth sampling frequency and synchronously with beginnings of periodic time slots, storage means responsible for storing temporarily the N identical sequences of digital samples delivered by the analog/digital conversion means during each time slot, and combination means responsible for combining in phase during each time slot the N identical sequences of digital samples stored in the storage means so as to deliver a sequence of digital samples combined at a reference symbol rate.

The second device (or despreading device) according to the invention can have other features and in particular, separately or in combination:

its combination means can comprise estimation means responsible for estimating the relative phase differences between the N identical sequences of digital samples, compensation means responsible for compensating the estimated phase differences so as to deliver N identical compensated sequences, and summation means responsible for summing the N identical compensated sequences so as to deliver the combined sequence of digital samples;

clock control means can be responsible for converting reference clock signals at the fourth frequency into working clock signals at the third frequency and for feeding the analog/digital conversion means with the working signals so that they can operate at the fourth frequency;

in a first variant, and in the presence of a ratio between the fourth frequency and the reference symbol rate greater than N, the analog/digital conversion means can be responsible for reducing by a factor N the number of samples per symbol of the N identical sequences of digital samples, whilst operating at the fourth frequency;

in a second variant, it can comprise clock control means responsible for converting reference clock signals at the fourth frequency into working clock signals at an intermediate frequency equal to J2 times the fourth frequency and lower than the third frequency and for feeding the analog/digital conversion means with the working signals so that they can operate at the intermediate frequency. In this case, the analog/digital conversion means are responsible for reducing by a factor K2 the number of samples per symbol of the N identical sequences of digital samples, where J2*K2=N, whilst operating at the intermediate frequency;

digital/analog conversion means responsible for generating, during each time slot and at the fourth sampling frequency, an analog output signal representing the combined sequence of digital samples;

on the one hand, first frequency conversion means responsible for converting the "primary" frequency of the analog input signal into a "secondary" frequency before it feeds the analog/digital conversion means and second frequency conversion means responsible for converting the secondary frequency of the analog output signal to the primary frequency;

demultiplexing means interleaved between the analog/digital conversion means and the storage means and responsible, in the presence of input signals on different carriers associated with different numbers of repetitions (or copies), for demultiplexing the repetitions of sequences as a function of the associated carriers. In this case, the storage means can consist of storage modules each associated with one of the carriers and responsible for storing the demultiplexed sequence repetitions that respectively correspond to them, and the combination means can consist of combination modules each associated with one of the carriers and each responsible for combining in phase during each time slot the repetitions of identical sequences of digital samples stored in the corresponding storage module so as to deliver a combined sequence of digital samples at the reference symbol rate. It then further comprises multiplexing means downstream of the combination modules and responsible for multiplexing the combined sequences of digital samples (delivered by the combination modules) so as to deliver multiplexes of sequences.

The invention also proposes a demodulator of signals transmitted by radio (possibly of multicarrier type) equipped with a second signal processing device (or despreading device) of the type described hereinabove.

The invention is particularly well adapted, although not exclusively so, to satellite communications, in particular of DVB-RCS (Digital Video Broadcasting—Return Channel by Satellite) type.

BRIEF DESCRIPTION OF DRAWINGS

Other features and advantages of the invention will become apparent on reading the following detailed description and examining the appended drawings, in which.

The appended drawings constitute part of the description of the invention as well as contributing to the definition of the invention, if necessary.

DETAILED DESCRIPTION

An object of the invention is for communication terminals to transmit analog signals (representing bursts of data) in the presence of constraints relating to the size of their send/receive antennas and to the limitation of the off-axis power spectral density.

It is considered hereinafter by way of nonlimiting example that communications are effected on the "return" channel, i.e. between (radio) communication terminals and a satellite gateway, via at least one communication satellite of a satellite network and in accordance with the DVB-RCS (MF-TDMA type) standard. Remember that in the case of the DVB standard the streams (of bursts of data) on the return channel are modulated in accordance with the DVB-RCS standard and that the streams on the "go" channel (i.e. between the satellite gateway and the terminals, via the communication satellites) are modulated in accordance with the (TDM type) DVB-S2 standard. In other words, a communication terminal sends in DVB-RCS and receives in DVB-S2, while a satellite gateway sends in DVB-S2 and receives in DVB-RCS.

The invention is not limited to communications conforming to the DVB-RCS standard, of course. It concerns all situations in which a communication terminal must transmit bursts of data by radio to another communication equipment in the presence of constraints relating to the dimensions of its send/receive antenna and to off-axis power spectral density limitation.

Figure 1:
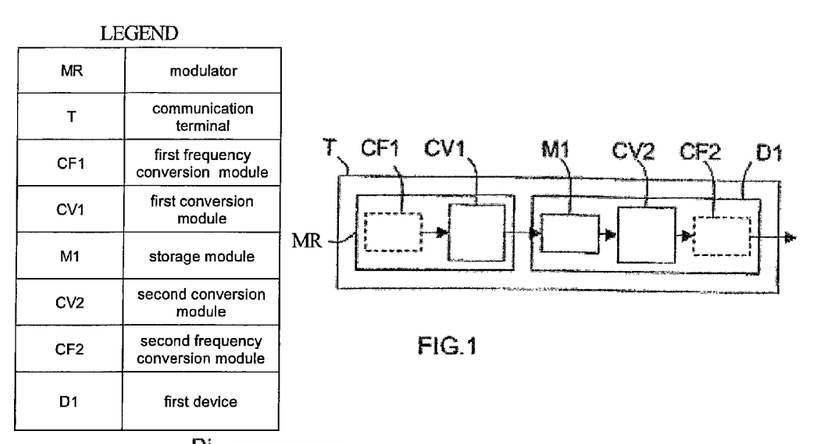
FIG. 1 is a functional diagram of a radio communication terminal equipped with a first embodiment of a first signal processing device (or spreading device) according to the invention.

A first embodiment of a first device for processing signals to be transmitted (or spreading device) D1 according to the invention is described first with reference to FIG. 1.

According to the invention, a first device D1 comprises at least one storage module M1 and one digital/analog conversion module CV2.

The storage module M1 is responsible for storing temporarily at the beginning of each time slot a sequence of digital samples of an analog signal, hereinafter referred to as an input sequence, at a first sampling frequency. Fe1 and synchronized with beginnings of periodic time slots.

Each sequence of digital samples is supplied by the analog/digital conversion module CV1 of a modulator MR (here of DVB-RCS type) of a communication terminal T, for example.

The communication terminal T is a send/receive terminal, for example of satellite, collective type, installed on a train. However, it could be a question of any radio communication equipment, fixed or mobile (or portable), capable of exchanging data in the form of signals by radio with another equipment, possibly via one or more communication satellites, for example a terrestrial communication station (possibly of the satellite type), a satellite gateway (or hub), or a fixed or portable computer, possibly of the satellite type.

In the example illustrated by FIG. 1, the first device D1 is installed in a communication terminal T, to be more precise at the output of the analog/digital conversion module CV1 of its modulator MR. However, as will emerge later, it could be installed in the modulator MR or be external to the terminal T but connected to the output of the analog/digital conversion module CV1 of its modulator MR. The modulator MR uses clock signals at the first frequency Fe1. Its analog/digital conversion module CV1 samples each analog input signal to produce a sequence of digital samples. This sampling is effected at the first sampling frequency Fe1 and is synchronized to the beginning of each periodic time slot. Consequently, the analog/digital module CV1 delivers a sequence of digital samples representing a received burst during each time slot and at a reference symbol timing rate RS such that Fe1/RS>1.

Figure 2A:
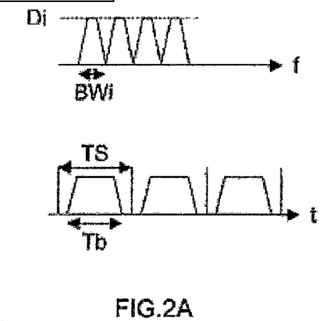
FIG. 2A is a diagram showing, for a multicarrier spectrum, firstly (upper portion) the power spectral density before spreading in accordance with the invention, as a function of frequency, and, secondly (lower portion), successive bursts representing analog signals to be transmitted before spreading in accordance with the invention in successive time slots.

The analog input signals represent bursts of data and can be represented diagrammatically as in the lower portion of FIG. 2A. As shown, each signal representing a burst takes the form of a packet of duration Tb situated in a time slot of duration Ts (t represents time).

The power spectral density Di at the output of the modulator MR is shown in the upper portion of FIG. 2A as a function of frequency f, in the case of a multicarrier spectrum. It is important to note that the spectra are not necessarily periodic. They can in fact be carriers with different data rates. This power spectral density Di takes the form of a signal occupying a bandwidth BWi defined by the equation BWi= $(1+\alpha)*RS$, where $\alpha$ is the roll-off (gain variation) parameter.

For the storage module M1 to be able to store each sequence delivered by the analog/digital conversion module CV1, its size must be at least equal to Fe1*TS and the frequency of writing symbols of a sequence into the storage module M1 must be equal to Fe1. The storage module M1 takes the form of a buffer, for example.

The digital/analog conversion module CV2 is responsible for generating in each time slot an analog output signal (to be transmitted) representing N repetitions (or copies) of the sequence of digital samples that is stored in the storage module M1 during the time slot concerned. N is an integer strictly greater than 1 (N>1), and is referred to hereinafter as the spreading factor. This generation is effected at a second sampling frequency Fe2 equal to N times the first sampling frequency (Fe2=N*Fe1). The digital/analog conversion module CV2 therefore delivers at its output, during each time slot, an analog signal with a symbol (or chip) rate RC equal to N times the reference symbol rate RS (RC=N*RS).

Figure 2B:
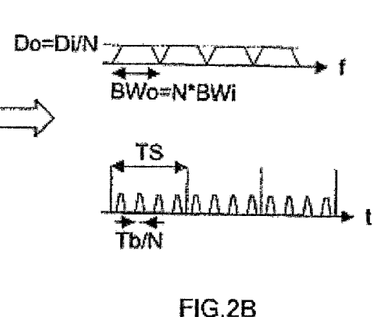
FIG. 2B is a diagram showing, for a multicarrier spectrum, on the one hand (upper portion), the power spectral density as a function of frequency after spreading in accordance with the invention, and, on the other hand (lower portion), successive bursts after spreading in accordance with the invention, representing analog signals to be transmitted in successive time slots.

In other words, and as shown in the lower portion of FIG. 2B, the digital/analog conversion module CV2 delivers at its output, in each time slot, N analog copies (or repetitions) of the digital symbols of the sequence that is stored in the storage module M1 during said time slot. In this example N is equal to four (4). However, as indicated hereinabove, the spreading factor N can take any integer value strictly greater than one (1).

To this end, the digital/analog conversion module CV2 can read the content of the storage module M1 N times, for example, and carry out the digital/analog conversion of the read sequence of digital samples N times in each time slot. In this case, the reading frequency Fr is equal to N times the first sampling frequency Fe1 (Fr=N*Fe1).

The power spectral density Do at the output of the digital/analog conversion module CV2 is shown in the upper portion of FIG. 2B as a function of frequency f. Because of the spreading by the spreading factor N, it is equal to Di/N (Do=Di/N). It takes the form of a signal occupying a bandwidth BWo, defined by the equation BWo=N*BWi=N*(1+α)*RS.

The invention therefore "artificially" increases by a chosen factor N the reference symbol rate RS of a burst initially contained in a time slot, at the same time inducing an increase by a factor N in the occupied bandwidth. The power of each burst having to remain the same in order to reduce the power spectral density, the ratio Es/NO is then reduced by the factor N. For the ratio Es/NO to return to its nominal value, the invention therefore repeats each burst N times during each time slot. On reception it then remains only to (re)combine the N copies (or repetitions) received in each time slot to recover the corresponding initial burst (or packet), as described hereinafter with reference to FIGS. 7, 9A and 9B.

Several solutions can be envisaged for the first device D1 to be able to increase artificially by the factor N the reference symbol timing rate RS.

A first solution "decimates" the digital signals by the factor N. To this end, the digital/analog conversion module CV2 of the first device D1 can, if the ratio Fe1/RS is greater than N (oversampling), reduce by a factor N the number of samples per symbol of the sequence of digital samples repeated N times (this is known as "decimation"), working with the first frequency Fe1 (supplied by the reference clock).

Figure 3:
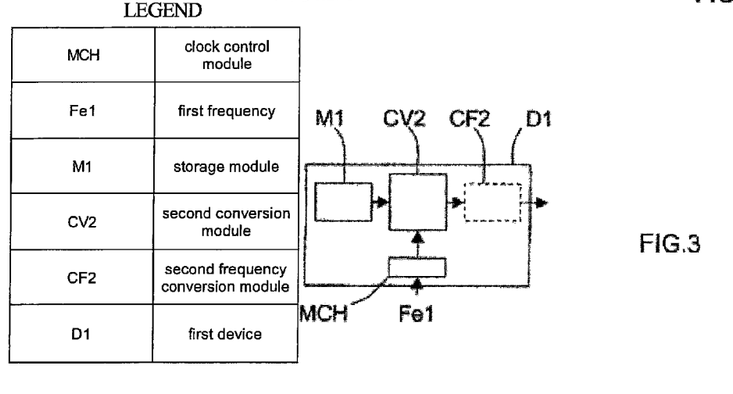
FIG. 3 is a functional diagram of a second embodiment of a first signal processing device (or spreading device) according to the invention.

A second solution increases the first frequency Fe1 of the clock of the digital/analog converter CV2. To this end, and as shown in FIG. 3, the first device D1 can comprise a clock control module MCH responsible for transforming the reference clock signals at the first frequency Fe1 from the modulator MR as working clock signals at the second frequency Fe2 equal to N times the first frequency Fe1 (Fe2=N*Fe1). This clock control module MCH then supplies the digital/analog conversion module CV2 with working clock signals in order for it to be able to operate directly at the second frequency Fe2.

A third solution combines the previous two solutions by increasing the clock frequency used by the digital/analog conversion module CV2 (Fe1→Fe'1) by a factor j1 by means of the clock control module MCH and decimating the digital signal by a factor k1, where j1*k1=N, in the digital/analog conversion module CV2, so that the apparent modulation rate (or frequency) RC is equal to N*RS. This imposes that Fe'1=k1*Fe1 and Fe1<RC. With these definitions and conditions, the first solution corresponds to the case where j1=1 (Fe'1=Fe1) and k1=N while the second solution corresponds to the case where j1=N (Fe'1=N*Fe1=Fe2) and k1=1.

As shown in FIG. 1, the first device (or spreading device D1) can also include a second frequency conversion module CF2 placed downstream of its digital/analog conversion module CV2. This kind of (second) frequency conversion module CF2 must be provided if the analog/digital conversion module CV1 receives analog input signals that result from converting a "primary" frequency F1 into a "secondary" frequency F2 by means of a (first) frequency conversion module CF1 of the modulator MR (on the upstream side of the analog/digital conversion module CV1). This secondary frequency is the baseband frequency, for example.

The second frequency conversion module CF2 is then responsible for converting into a primary sequence F1 the secondary frequency that each analog output signal includes and delivered by the digital/analog conversion module CV2 before it is sent.

There is described hereinabove one embodiment of a first device D1 forming part of a terminal T and coupled to the output of the analog/digital conversion module CV1 of the modulator MR. However, several variant embodiments can be envisaged.

Figure 4:
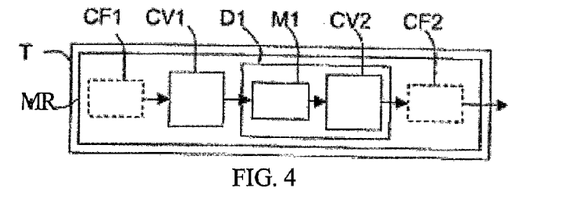
FIG. 4 is a functional diagram of a radio communication terminal equipped with a modulator comprising the first embodiment of the first signal processing device (or spreading device) according to the invention.

Accordingly, and as shown in FIG. 4, the first device D1 can be part of the modulator MR. Here it includes the memory M1, coupled to the output of the analog/digital conversion module CV1, and the digital/analog conversion module CV2. It can further include a second frequency conversion module CF2.

Figure 5:
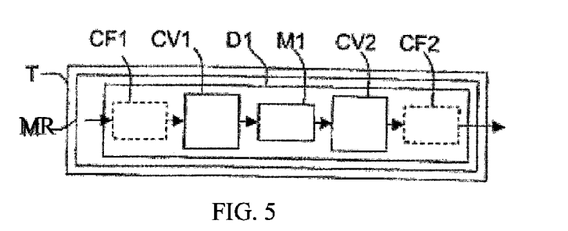
FIG. 5 is a functional diagram of a radio communication terminal equipped with a modulator comprising a third embodiment of the first signal processing device (or spreading device) according to the invention.

As shown in FIG. 5, the first device D1 can also be part of the modulator MR, but include the analog/digital conversion module CV1, the memory M1 and the digital/analog conversion module CV2, as well as where applicable the first and second frequency conversion modules CF1 and CF2.

Figure 6:
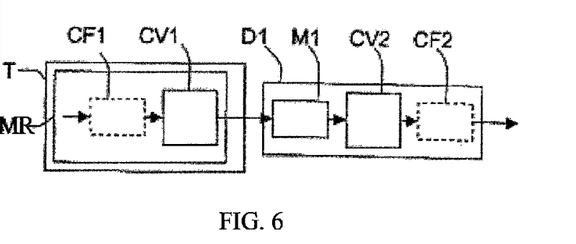
FIG. 6 is a functional diagram of a radio communication terminal equipped with a modulator connected to a fourth embodiment of a first signal processing device (or spreading device) according to the invention, of the external type.

As shown in FIG. 6, the first device D1 can be external to the modulator MR (which includes the analog/digital conversion module CV1 and where applicable a first frequency conversion module CF1). It then includes the memory M1 coupled to the output modulator MR, to be more precise to the output of its analog/digital conversion module CV1, and the digital/analog conversion module CV2. It can also comprise a second frequency conversion module CF2.

A first embodiment of a second device (or despreading device) D2 according to the invention dedicated to processing analog signals from a first device D1 according to the invention is described next with reference to FIG. 7. Each signal received in a time slot, hereinafter referred to as an (analog) input signal, therefore represents N repetitions (or copies) of a sequence of digital samples. N is the same spreading factor as that described hereinabove (N is an integer strictly greater than 1).

In this example, the second device D2 is installed in a carrier demodulator DR, here of DVB-RCS type, itself installed in a communication equipment R. In this case, the second device D2 is fed with analog signals to be processed (despread) by its carrier demodulator DR. However, as will emerge later, the second device D2 could be external to the carrier demodulator DR and coupled to its input. In this case, the receive portion of the communication equipment R feeds with analog signals to be processed (despread) the input of the second device D2, the output of which feeds the input of the carrier demodulator DR.

The communication equipment R considered here is a satellite communication gateway (or hub). However, it could be any fixed or mobile (or portable) radio communication equipment capable of exchanging data in the form of signals by radio with another equipment, where applicable via one or more communication satellites, for example an individual or collective send/receive terminal (possibly of the satellite type), a terrestrial communication station (possibly of the satellite type), or a fixed or portable computer, possibly of the satellite type.

According to the invention, a second device D2 comprises at least one analog/digital conversion module CV3, storage means M2 and combination means CB.

The analog/digital conversion module CV3 is fed with analog input signals each representing N repetitions (or copies) of a sequence of digital samples. These analog input signals are shown diagrammatically in the lower portion of FIG. 9A, in the case of a multicarrier spectrum. As shown, each time slot of duration TS contains N input signals representing N copies (or repetitions) of an initial packet (before spreading), and each copy takes the form of a burst of duration Tb' equal to Tb/N (t represents time).

Figure 9A:
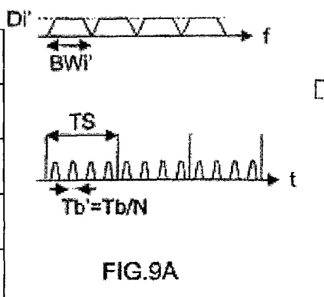
FIG. 9A is a diagram showing, for a multicarrier spectrum, on the first hand (upper portion), the power spectral density received as a function of frequency before despreading in accordance with the invention and, on the other hand (lower portion), successive bursts representing receive analog signals, before despreading in accordance with the invention, in successive time slots.

The power spectral density D1' at the input of the second device D2 is shown in the upper portion of FIG. 9A as a function of frequency f in the case of a multicarrier spectrum. It takes the form of a signal occupying a bandwidth BWi' defined by the equation $BWi'=N*(1+\alpha)*RS$.

The analog/digital conversion module CV3 is responsible for sampling the N analog input signals (or bursts) received in each time slot in N sequences of digital samples (deemed to be identical). This sampling is effected at a third sampling frequency Fe3 equal to N times a fourth sampling frequency Fe4 and synchronously with the beginning of each periodic time slot. Consequently, the analog/digital conversion module CV3 delivers N sequences of digital samples representing the same packet in each time slot.

A number of solutions can be envisaged for the second device D2 to be able to deliver N identical sequences of digital samples during each time slot. Those solutions are more specifically intended to enable the working symbol rate of the analog/digital conversion module CV3 to be increased by a factor N compared to the reference (unspread) symbol rate RS.

It is important to note that the sampling clock used by the analog/digital conversion module CV3 must be compatible with the bandwidth of the incoming spread signal.

A first solution is to decimate the digital signals by the factor N. To this end, the analog/digital conversion module CV3 of the second device D2 can, if the ratio Fe4/RS is greater than N (oversampling), reduce by a factor N the number of samples per symbol of the N identical sequences of digital samples (decimation), operating at the fourth frequency Fe4 (provided by its reference clock).

Figure 8:
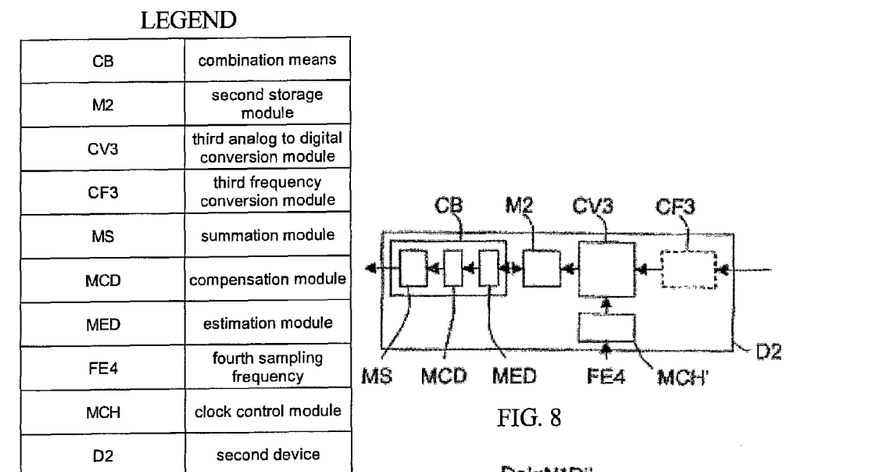
FIG. 8 is a functional diagram of a second embodiment of a second signal processing device (or despreading device) according to the invention.

A second solution is to increase the fourth frequency Fe4 of the clock of the analog/digital conversion module CV3. To this end, as shown in FIG. 8, the second device D2 can comprise a clock control module MCH' responsible for converting the reference clock signals at the fourth frequency Fe4 of the demodulator DM into working clock signals at the third frequency Fe3 equal to N times the fourth frequency Fe4 ($Fe3=N*Fe4$). This clock control module MCH' then feeds the analog/digital conversion module CV3 with the working clock signals in order for it to be able to operate directly at the third frequency Fe3.

A third solution combines the previous two solutions by increasing the clock frequency used by the analog/digital conversion module CV3 (Fe4→Fe'4) by a factor j2 by means of the clock control module MCH' and decimating the digital signal by a factor k2, where $j2*k2=N$, in the analog/digital conversion module CV3, so that the apparent modulation rate (or frequency) RC is equal to $N*RS$. This requires $Fe'4=k2*Fe4$ and Fe'4<RC. With these definitions and conditions, the first solution corresponds to the case where j2=1 (Fe'4=Fe4) and k2=N and the second solution corresponds to the case where j2=N (Fe'4=N*Fe4=Fe3) and k2=1.

The storage means M2 are responsible for storing temporarily at the beginning of each time slot the N identical sequences of digital samples delivered by the analog/digital conversion module CV3 during the preceding time slot. To this end, the size of the storage means M2 must be at least equal to $N*Fe4*TS$ and the rate of writing the symbols of a sequence into the storage means M2 must be equal to $N*Fe4$. The storage means M2 take the form of a buffer, for example.

The combination means CB are responsible for combining in phase during each time slot the N identical sequences of digital samples stored in the storage means M2 in order to deliver at the output a "combined" sequence of digital samples at the reference symbol rate RS.

Figure 7:
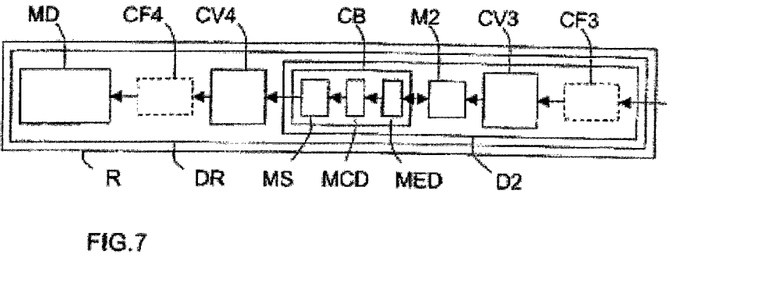
FIG. 7 is a functional diagram of a radio receiver equipped with a first embodiment of a second signal processing device (or despreading device) according to the invention.

To effect each phase combination, the combination means CB comprise, for example, an estimation module MED, a compensation module MCD and a summation module MS, as shown in FIG. 7.

The estimation module MED is responsible for reading the content of the storage means M2 once to detect the N identical sequences and to estimate their relative phase differences. The reading frequency Fr is equal to the fourth sampling frequency Fe4 (Fr=Fe4). It is important to note that the fourth sampling frequency Fe4 can be the same as or different from the first sampling frequency Fe1.

The compensation module MCD is responsible for compensating each phase difference estimated by the estimation module MED in order to deliver N identical compensated sequences.

The summation module MS is responsible for summing (or adding) the N identical sequences the phase differences whereof have been compensated by the compensation module MCD in order to deliver at its output a combined sequence of digital samples.

In the first and second embodiments shown in FIGS. 7 and 8, the output of the combination means CB constitutes the output of the second device D2. This output supplies to the digital/analog conversion module CV4 of the demodulator DR a combined sequence of digital samples in each time slot.

The digital/analog conversion module CV4 is responsible for generating in each time slot and at the fourth sampling frequency Fe4 an analog output signal representing the received combined sequence of digital samples.

Figure 9B:
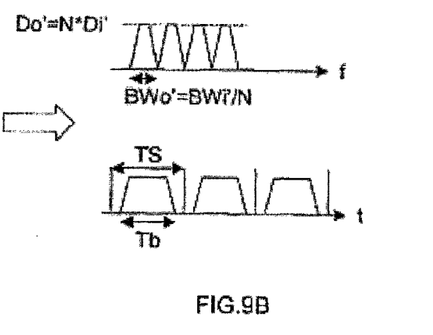
FIG. 9B is a diagram showing, for a multicarrier spectrum, on the one hand (upper portion), the power spectral density received as a function of frequency, after despreading according to the invention and, on the other hand (lower portion), successive bursts after despreading in accordance with the invention representing analog signals transmitted in successive time slots.

Each analog signal represents a data burst and can be of the form shown diagrammatically in the lower portion of FIG. 9b in the case of a multicarrier spectrum. As shown, each signal representing a burst takes the form of a burst of duration Tb situated in a time slot of duration TS (t represents time).

The power spectral density Do' at the output of the digital/analog conversion module CV4 is shown in the upper portion of FIG. 9B as a function of frequency f in the case of a multicarrier spectrum. Because of the combination, it is equal to N times Di' (Do'=N*Di'). It takes the form of a signal occupying a bandwidth BWo' defined by the equation BWo'=BWi'/N=(1+α)*RS.

As shown in FIGS. 7 and 8, the second device (or despreading device) D2 can also comprise a (first) frequency conversion module CF3 on the upstream side of its analog/digital conversion module CV3.

The frequency conversion module CF3 is responsible for converting the primary frequency Fl of each received analog input signal (to be processed (or despread)) into a secondary frequency before it feeds the analog/digital conversion module CV3. This secondary frequency is the baseband frequency, for example.

In this case, the demodulator DR comprises, downstream of its digital/analog conversion module CV4, a second frequency conversion module CF4 responsible for converting to the primary frequency Fl the secondary frequency of each analog output signal delivered by the digital/analog conversion module CV4 before it is demodulated by the carrier demodulation module MD of the demodulator DR.

Figure 10:
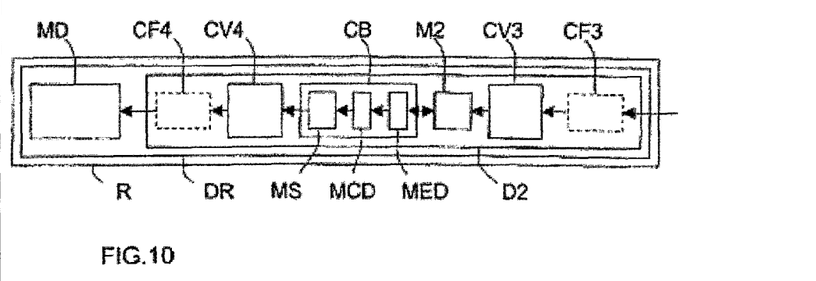
FIG. 10 is a functional diagram of a radio receiver equipped with a third embodiment of a second signaling processing device (or despreading device) according to the invention.

As shown in FIG. 10, the second device D2 can be part of a demodulator DR and include, complementing its analog/digital conversion module CV3, storage means M2 and combination means CB, the digital/analog conversion module CV4 and where applicable a second frequency conversion module CF4.

There has been described hereinabove an embodiment of a second device D2 forming part of a demodulator DR of a receiver R. Several variants may be envisaged, however.

Figure 11:
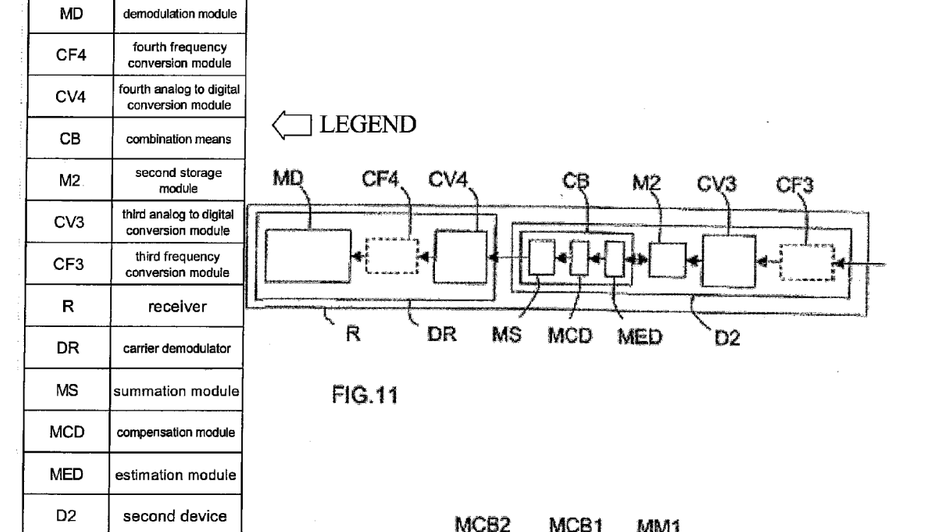
FIG. 11 is a functional diagram of a radio receiver equipped with a demodulator connected to a fourth embodiment of a second signal processing device (or despreading device) according to the invention, of the external type.

Accordingly, and as shown in FIG. 11, the second device D2 can be external to the demodulator DR (which includes the digital/analog conversion module CV4, the carrier demodulation module MD, and where applicable a second frequency conversion module CF4). It then includes the analog/digital conversion module CV3, the storage means M2 and the combination means CB, and where applicable a first frequency conversion module CF3. The output of the combination means CB is then coupled to the demodulator DR, to be more precise to the input of its digital/analog conversion module CV4.

One embodiment of a second device (or despreading device) D2 according to the invention is described next with reference to FIG. 12; it is a variant of the embodiments described hereinabove with reference to FIGS. 7 to 11, and is intended to process (despread) analog input signals on different carriers Pi (i=1 to K), associated with numbers Ni of repetitions (or copies) whose values differ, at least for some of them.

To enable this type of processing (despreading) of signals with different carriers Pi, the second embodiment comprises, firstly, an analog/digital conversion module CV3 (and where applicable a digital/analog conversion module CV4, a first frequency conversion module CF3 (as shown) and a second frequency conversion module CF4) of the types described hereinabove with reference to FIGS. 7 to 11, secondly, storage means M2 taking the form of storage modules MMi each dedicated to storing Ni sequences of digital samples associated with the carriers Pi, combination means CB taking the form of combination modules MCBi each dedicated to combining Ni sequences of digital samples stored in the corresponding storage module MMi (associated with a carrier Pi), and, thirdly, a demultiplexing module DM and a multiplexing module MR.

The demultiplexing module DM is interleaved between the analog/digital conversion module CV3 and the modular storage means M2 (MMi). It is responsible for demultiplexing the Ni repetitions (or copies) of the sequences of digital samples, which are multiplexed and sent to it by the analog/digital conversion module CV3, as a function of their respective carrier Pi. In other words, the demultiplexing module DM delivers at K outputs K sets of Ni identical sequences of digital samples respectively associated with the K carriers Pi (P1 to PK).

Each output of the demultiplexing module DM is coupled to the input of one of the K storage modules MMi (MM1 to MMK) of the storage means M2. Thus each storage module MMi can store during a time slot Ni identical (demultiplexed) sequences corresponding to the carrier Pi to which it is dedicated.

Moreover, each combination module MCBi of the combination means CB is coupled to the storage module MMi that corresponds to the carrier Pi to which it is dedicated. Each combination module MCBi comprises a structure of the type described hereinabove. It consequently preferably comprises an estimation module MEDi, a compensation module MCDi and a summation module MSi, although this is not shown in FIG. 12. Thus each combination module MCBi can combine in phase (by the method described hereinabove), during each time slot, the Ni identical sequences of digital samples that are stored in the storage module MMi to which it is coupled, in order to deliver at the output a combined sequence of digital samples. This combination is effected by estimating the relative phase differences between the Ni identical sequences of digital samples stored in the storage module MMi concerned, and then compensating each estimated phase difference to deliver Ni identical compensated sequences, and finally summation (or addition) of the Ni identical sequences with compensated phase differences in order to deliver a combined sequence of digital samples.

The multiplexing module MR is at the output of the combination means CB and upstream of the digital/analog conversion module CV4 of the demodulator DR. It is responsible for multiplexing the combined sequences of digital samples delivered by the outputs of the K combination modules MCBi (MCB1 to MCBK) corresponding to the various carriers Pi (P1 to PK), in order to feed with multiplexed combined sequences of digital samples the digital/analog conversion module CV4. In other words, the multiplexing module MR delivers at an output a multiplex constituted from sequences received at its K inputs.

The digital/analogue conversion module CV4 of the demodulator DR then converts the multiplexes into analog output signals that are intended to feed the portion MD of its demodulator DR dedicated to demodulation, where appropriate after frequency conversion by the second frequency converter CF4.

Figure 12:
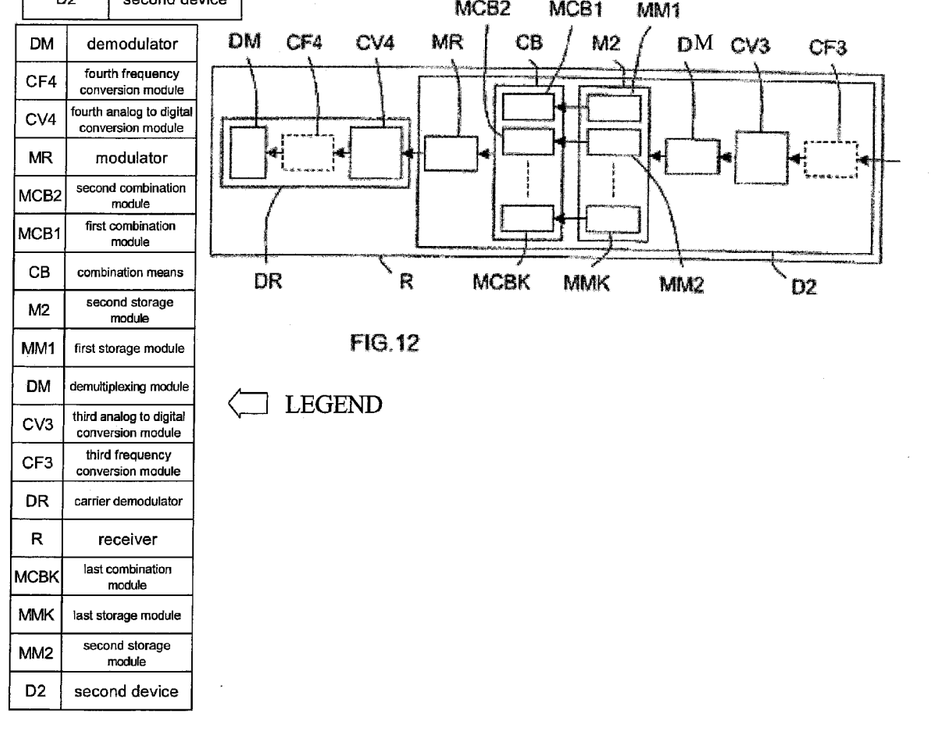
FIG. 12 is a functional diagram of a radio receiver equipped with a fifth embodiment of a second signal processing device (or despreading device) according to the invention.

In the embodiment shown in FIG. 12, the second device (or despreading device) D2 is external to the demodulator DR, and coupled thereto. However, in a variant, it could form part of the demodulator DR (as is the case in the embodiments shown in FIGS. 7 and 10).

The first and second signal processing devices D1 and D2 according to the invention, and in particular their analog/digital conversion and digital/analog conversion modules, their combination means, their storage means, where applicable their multiplexing and demultiplexing modules, and where applicable their first and second frequency conversion modules, can be produced in the form of electronic circuits or a combination of circuits and software (or data processing) modules.

The invention is not limited to the first and second signal processing device, communication terminal and demodulator embodiments described hereinabove by way of example only, and encompasses all variants that the person skilled in the art might envisage within the scope of the following claims.

The invention claimed is:

1. A device for processing signals to be transmitted by radio, comprising:
   a buffer adapted to temporarily store a sequence of digital samples of an analog input signal at a first sampling frequency in sequence with the beginnings of periodic time slots, and
   a digital-to-analog converter adapted to generate, during each time slot and at a second sampling frequency equal to N times the first sampling frequency where N is an integer strictly greater than 1, an analog output signal, wherein the output signal represents N repetitions of the sequence of digital samples stored in the buffer during the time slot concerned and is transmitted at a symbol rate equal to N times a reference symbol rate.

2. A device according to claim 1, further comprising clock controller adapted to convert reference clock signals at the first sampling frequency into working clock signals at the second sampling frequency and for feeding the digital-to-analog converter with the working clock signals so that they can operate at the second sampling frequency.

3. A device according to claim 1, where, the digital-to-analog converter is adapted to reduce by a factor N the number of samples per symbol of the sequence of digital symbols repeated N times, whilst operating at the first sampling frequency, in the presence of a ratio between the first sampling frequency and the reference symbol rate greater than N.

4. A device according to claim 1, further comprising a clock controller adapted to convert reference clock signals at the first sampling frequency into working clock signals at an intermediate frequency equal to J1 times the first sampling frequency and less than the second sampling frequency, and for feeding the digital-to-analog converter with the working signals so that they can operate at the intermediate frequency, and in that the digital-to-analog converter is adapted to reduce by a factor K1 the number of symbols per symbol of the sequence of digital samples repeated N times, where J1*K1=N, whilst operating at the intermediate frequency.

5. A device according to claim 1, further comprising an analog-to-digital converter adapted to sample each analog input signal to be transmitted to produce a sequence of digital samples at the first sampling frequency in sequence with the beginnings of periodic time slots so as to feed sequences of samples to the buffer.

6. A device according to claim 5, further comprising a first frequency conversion processor adapted to convert a primary frequency of the analog input signal into a secondary frequency before it feeds the analog-to-digital converter and a second frequency conversion processor adapted to convert the secondary frequency of the analog output signal into the primary frequency.

7. A device according to claim 6, wherein the secondary frequency is a baseband frequency.

8. A radio communication terminal, further comprising a signal processing device according to claim 1.

9. A device for processing analog signals coming from a signal processing device according to claim 1, comprising:
   an analog-to-digital converter adapted to sample an analog input signal representing N repetitions of sequences of digital samples, where N is an integer strictly greater than 1, to produce N identical sequences of digital samples at a third sampling frequency equal to N times a fourth sampling frequency in sequence with beginnings of periodic time slots,
   a buffer adapted to store temporarily the N identical sequences of digital samples delivered by the analog-to-digital converter during each time slot, and
   a combination processor adapted to combine in phase during each time slot the N identical sequences of digital samples stored in the buffer so as to deliver a sequence of digital samples combined at a reference symbol rate.

10. A device according to claim 9, where the combination processor further comprises:
    an estimation processor adapted to estimate the relative phase differences between the N identical sequences of digital samples,
        wherein the compensation processor is adapted to compensate the estimated phase differences so as to deliver N identical compensated sequences, and
    a summation processor adapted to sum the N identical sequences compensated so as to deliver the combined sequence of digital samples.

11. A device according to claim 9,
    further comprising a clock controller adapted to convert reference clock signals at the fourth frequency into working clock signals at the third frequency and for feeding the analog-to-digital converter with the working signals so that they can operate at the fourth frequency.

12. A device according to claim 9, wherein, the analog-to-digital converter is adapted to reduce by a factor N the number of samples per symbol of the N identical sequences of digital samples, whilst operating at the fourth sampling frequency, in the presence of a ratio between the fourth frequency and the reference symbol rate greater than N.

13. A device according to claim 9, wherein:
    the clock controller is adapted to convert reference clock signals at the fourth frequency into working clock signals at an intermediate frequency equal to J2 times the fourth frequency and lower than the third frequency and for feeding the analog-to-digital converter with the working signals so that they can operate at the intermediate frequency, and
    the analog-to-digital converter is adapted to reduce by a factor K2 the number of samples per symbol of the N identical sequences of digital samples, where J2*K2=N, whilst operating at the intermediate frequency.

14. Device according to claim 9, further comprising a digital-to-analog converter adapted to generate, during each time slot and at the fourth sampling frequency, an analog output signal representing the combined sequence of digital samples.

15. A device according to claim 14, wherein the first frequency conversion processor is adapted to convert a primary frequency of the analog input signal into a secondary frequency before it feeds the analog-to-digital converter and the second frequency conversion processor adapted to convert the secondary frequency of the analog output signal to the primary frequency.

16. A device according to claim 15, wherein the secondary frequency is baseband.

17. A device according to claim 9, further comprising:
    a demultiplexer located between the analog-to-digital converter and the buffer and adapted, in the presence of input signals on different carriers (Pi) associated with different numbers (Ni) of repetitions of values, for demultiplexing the repetitions of sequences as a function of the associated carriers,
        where the buffer consist of storage modules each associated with one of the carriers and adapted to store the demultiplexed sequence repetitions that respectively correspond to them, where the combination processor consists of combination modules each associated with one of the carriers and each adapted to combine in phase during each time slot the repetitions of identical sequences of digital samples stored in the corresponding storage module so as to deliver a combined sequence of digital samples at the reference symbol rate, and a multiplexer downstream of the combination modules and adapted to multiplex the combined sequences of digital samples delivered by the combination modules so as to deliver multiplexes of sequences.

18. A demodulator of signals transmitted by radio, further comprising a signal processing device according to claim 9.

19. A system for DVB-RCS type satellite communication comprising:
   a first device comprising:
      a buffer for temporarily storing a sequence of digital samples of an analog input signal according to a first sampling frequency and in a manner synchronized with respect to starts of periodic time slots, and
      a digital-to-analog converter operative to generate, during each time slot and according to a second sampling frequency equal to N times the first sampling frequency, where N is an integer strictly greater than 1, an analog output signal representative of N repetitions of the sequence of digital samples that is stored in the buffer during the time slot concerned, transmitted according to a symbol rate equal to N times a reference symbol rate;
   a second device, operative to process the analog signals output by the first device, including at least:
      an analog-to-digital converter operative to sample an analog input signal representing N repetitions of sequences of digital samples, where N is an integer strictly greater than 1, to produce N identical sequences of digital samples at a third sampling frequency equal to N times a fourth sampling frequency in sequence with beginnings of periodic time slots,
      a buffer operative to temporarily store the N identical sequences of digital samples delivered by analog-to-digital converter during each time slot, and
      a combination processor, operative to combine in phase during each time slot the N identical sequences of digital samples stored in the buffer so as to deliver a sequence of digital samples combined at a reference symbol rate; and
   a demodulator,
      wherein the demodulator includes at least:
         a digital-to-analog converter operative to generate from the output of the combination processor, in each time slot, and at a fourth sampling frequency, an analog output signal representing a combined sequence of digital signals,
         a frequency conversion processor operative to convert to a primary frequency a secondary frequency of each analog output signal of the digital-to-analog converter, and
         a carrier demodulation processor operative to demodulate the analog output of the frequency conversion processor.

20. A method for transmitting signals using a DVB-RCS type satellite communication standard comprising:
   storing temporarily in a first buffer, in a first device, a sequence of digital samples of an analog input signal according to a first sampling frequency and in a manner synchronized with respect to starts of periodic time slots;
   generating with a digital-to-analog converter, in a first device, during each time slot and according to a second sampling frequency equal to N times the first sampling frequency, where N is an integer strictly greater than 1, an analog output signal representative of N repetitions of the sequence of digital samples that is stored in the buffer during the time slot concerned, transmitted according to a symbol rate equal to N times a reference symbol rate;
   sampling with an analog-to-digital converter, in a second device, an analog input signal representing N repetitions of sequences of digital samples, where N is an integer strictly greater than 1, to produce N identical sequences of digital samples at a third sampling frequency equal to N times a fourth sampling frequency in sequence with beginnings of periodic time slots;
   temporarily storing in a second buffer, in a second device, the N identical sequences of digital samples delivered by analog-to-digital converter during each time slot;
   combining with a combination processor, in a second device, in phase during each time slot, the N identical sequences of digital samples stored in the buffer so as to deliver a sequence of digital samples combined at a reference symbol rate;
   generating with a digital-to-analog converter, in a demodulator, the output of the combination processor, in each time slot, and at a fourth sampling frequency, an analog output signal representing a combined sequence of digital signals;
   converting with a frequency conversion processor, in a demodulator, to a primary frequency a secondary frequency of each analog output signal of the digital-to-analog converter; and,
   demodulating with a carrier demodulation processor, in a demodulator, the analog output of the frequency conversion processor.

* * * * *